July 8, 1924.  1,500,298
H. M. CHASE ET AL
LONG CHAIN WARP TREATING APPARATUS
Filed Dec. 5, 1922     8 Sheets-Sheet 5
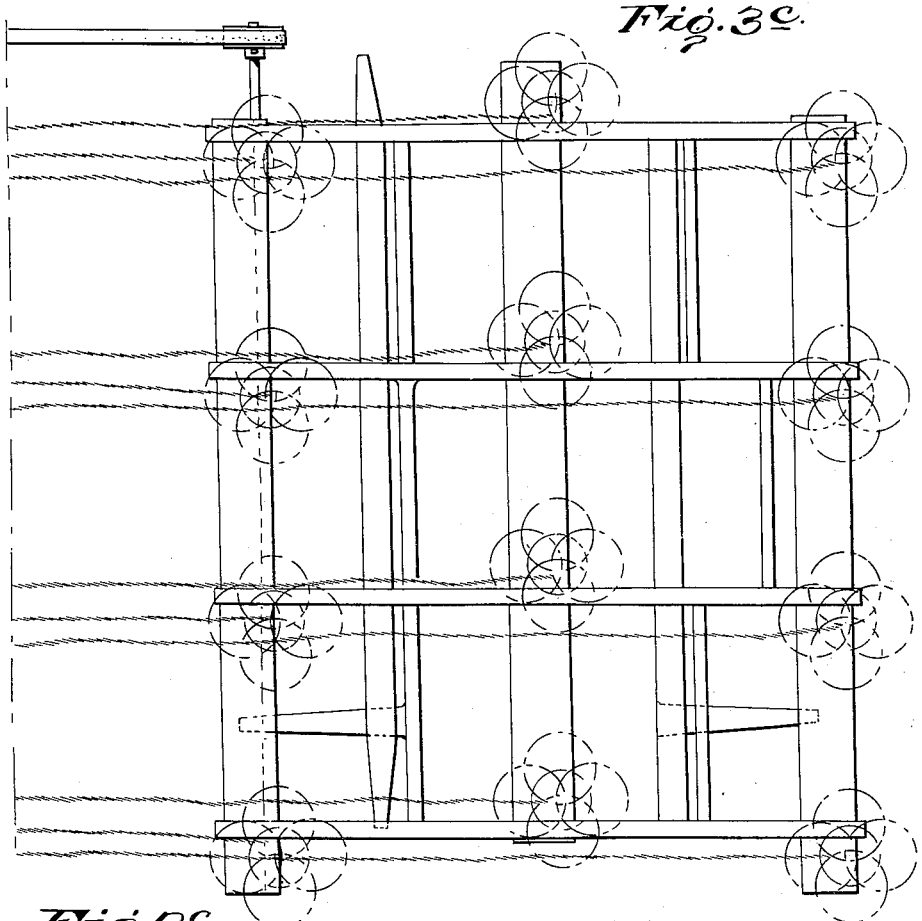
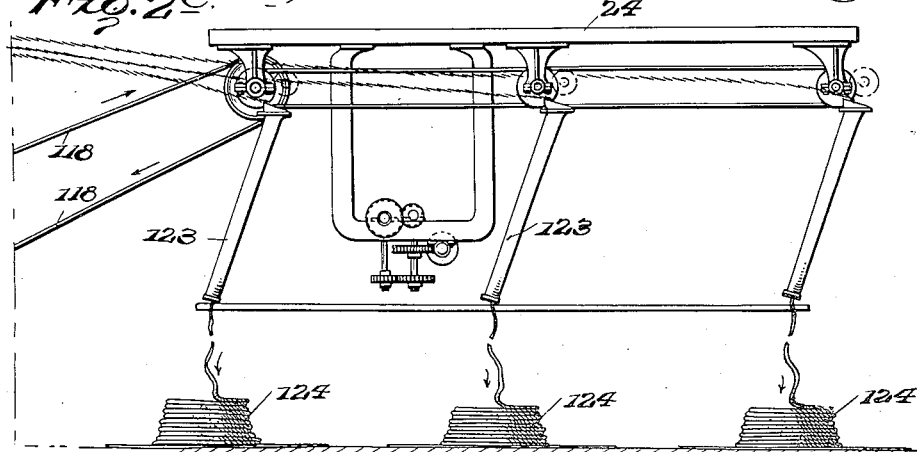
WITNESSES
W. A. Williams
INVENTORS
Harold Mason Chase
George Wilmot Robertson
BY
ATTORNEYS

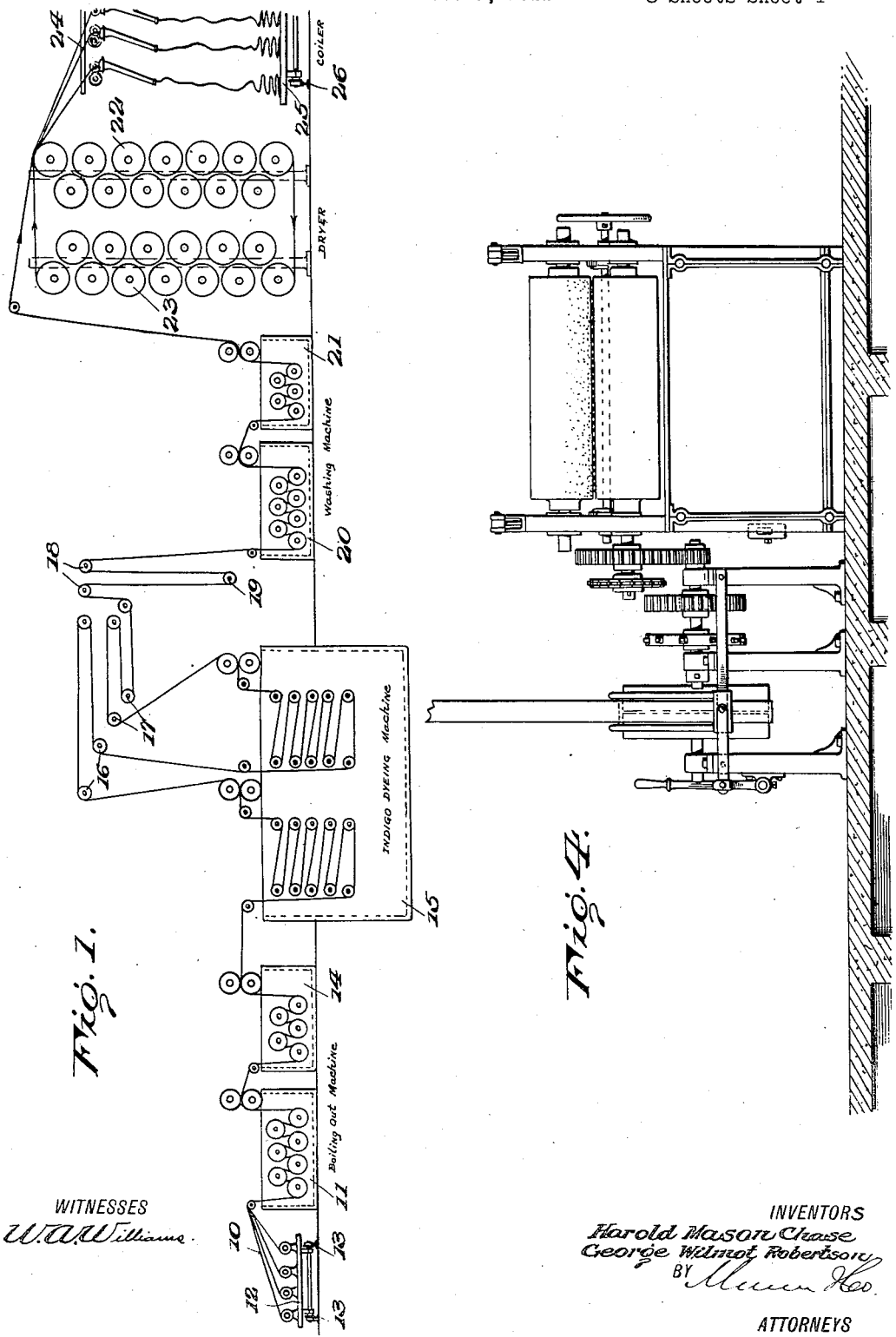

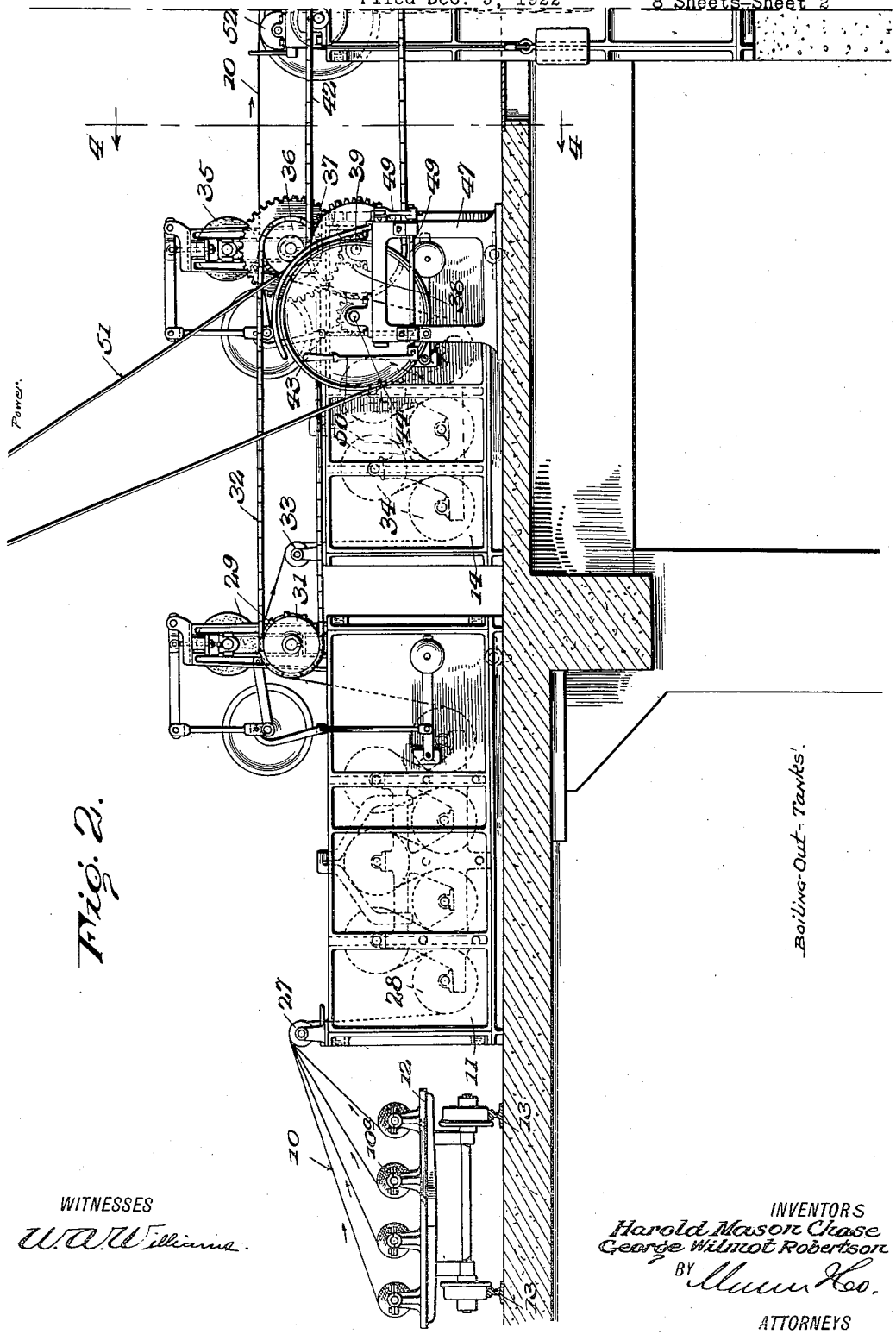

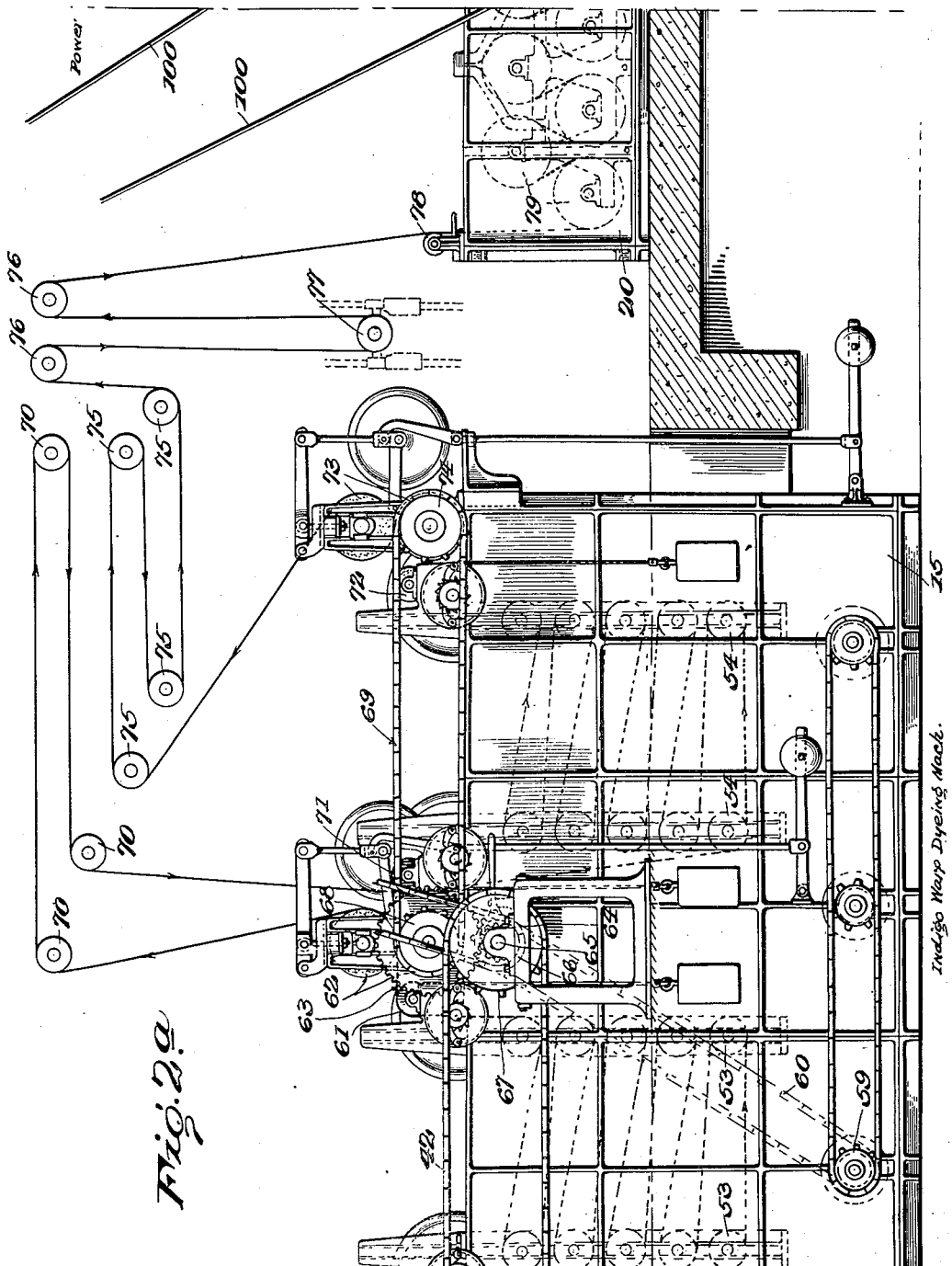

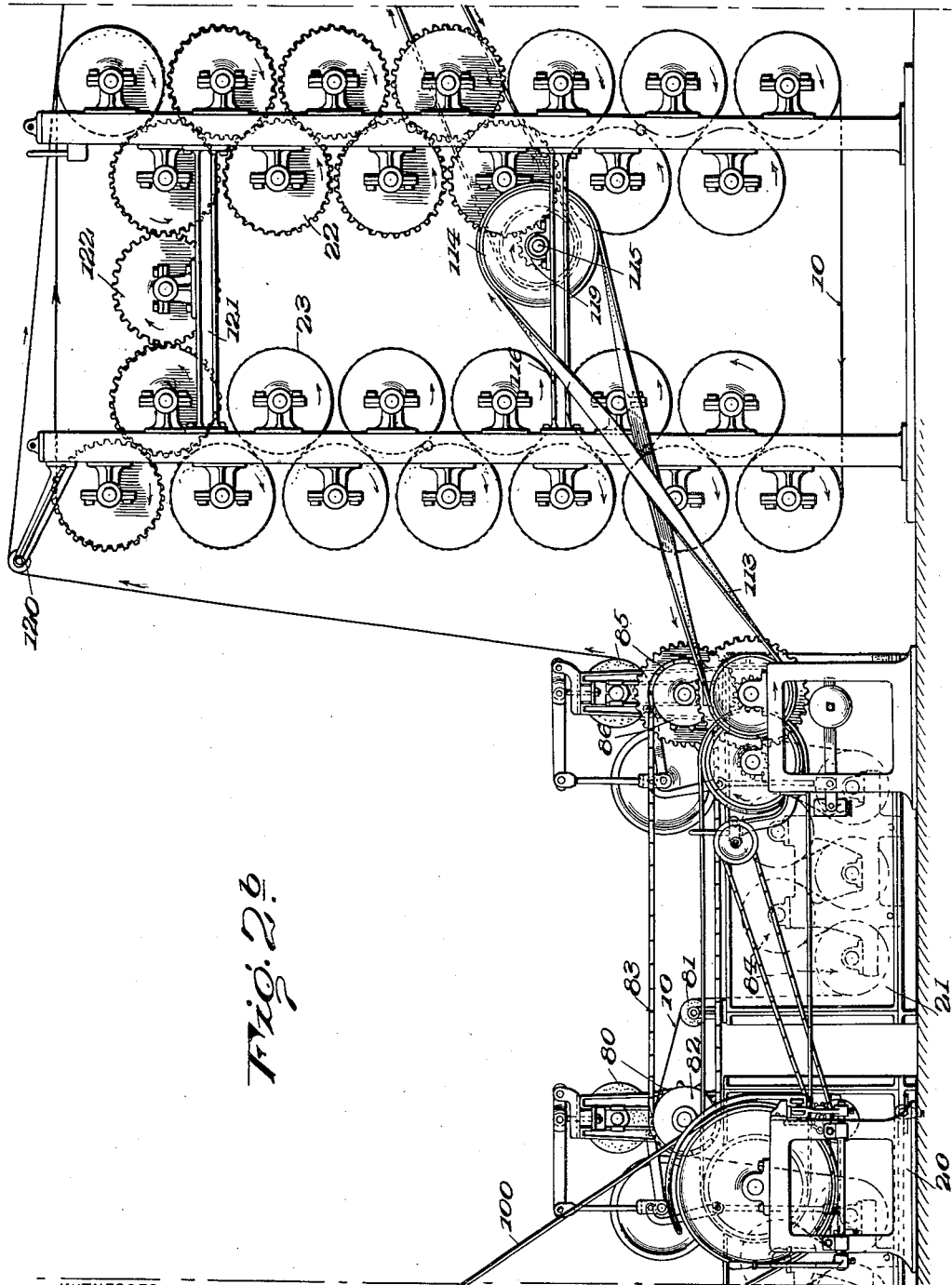

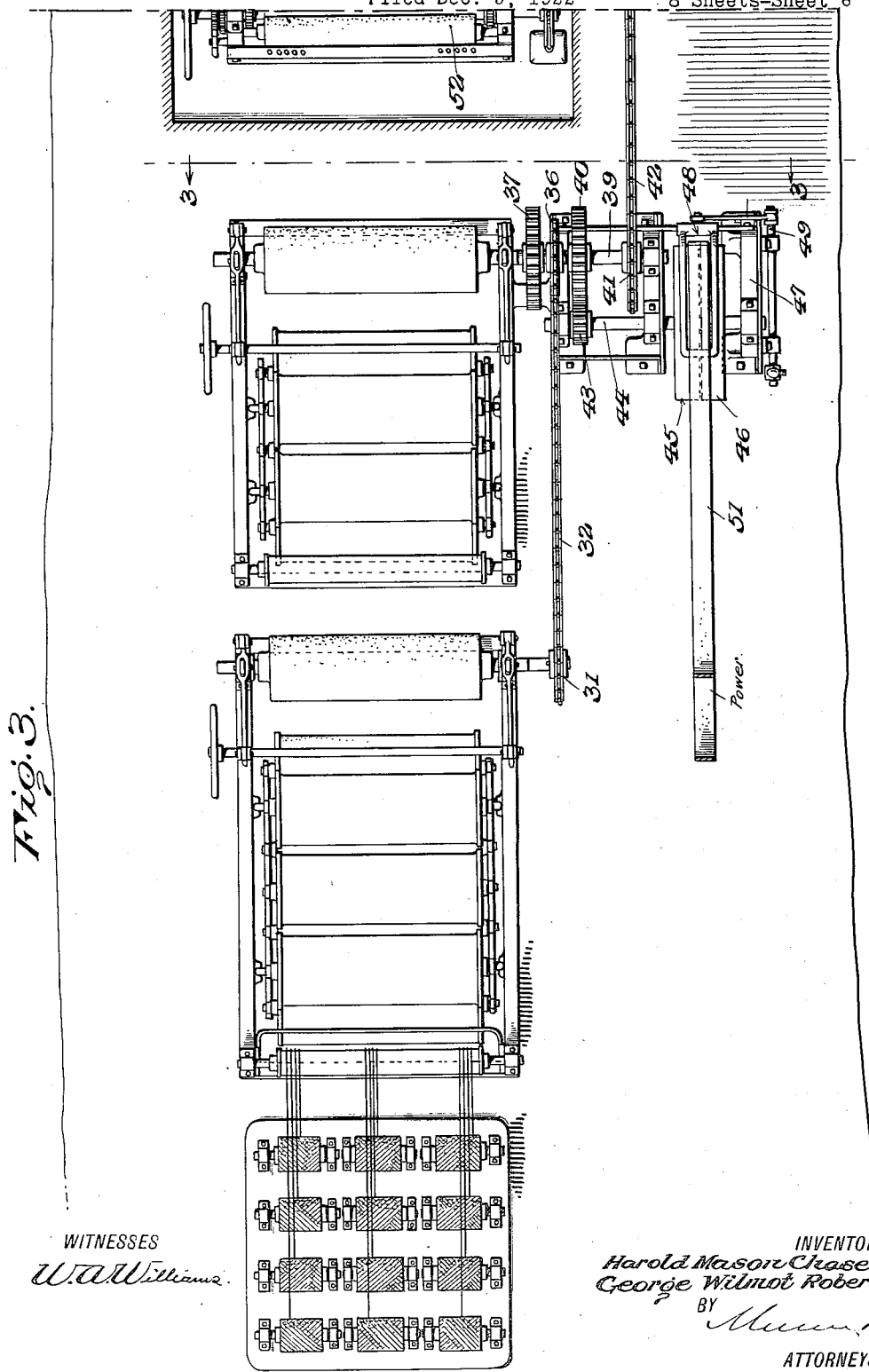

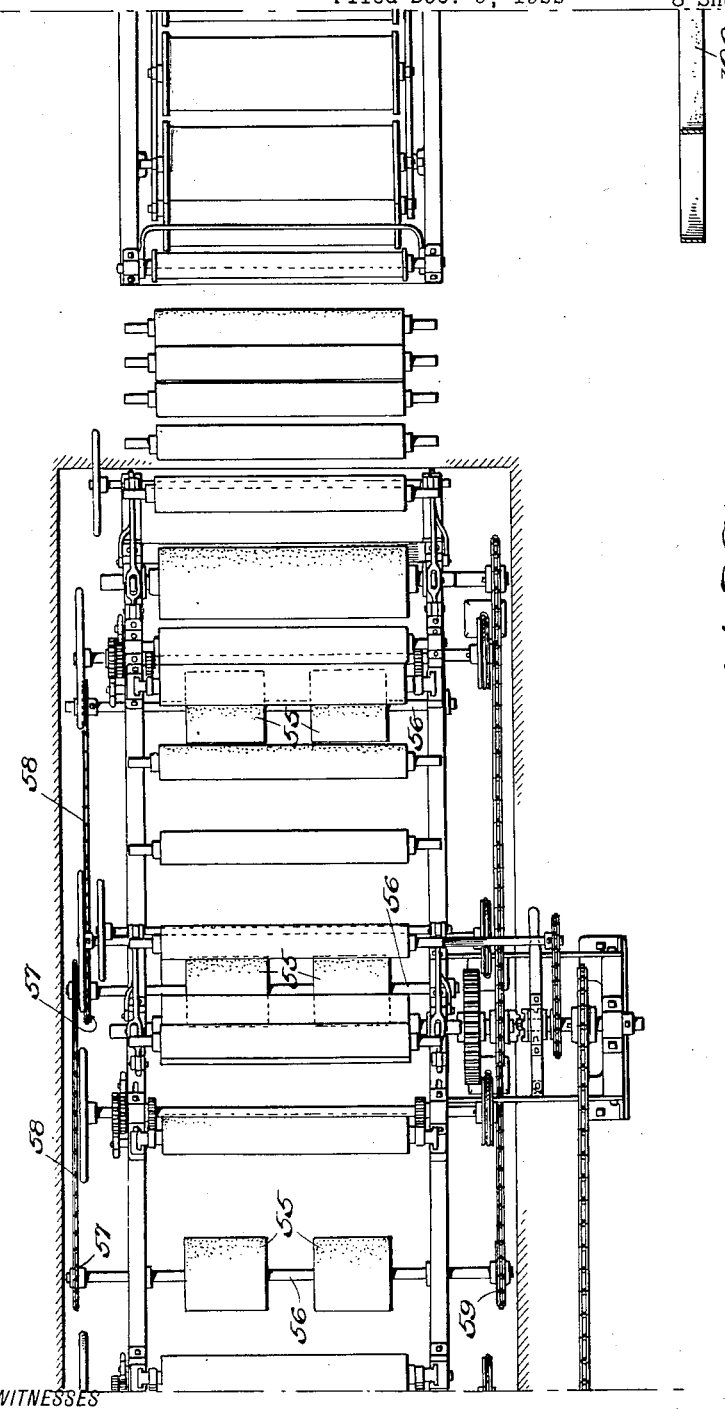

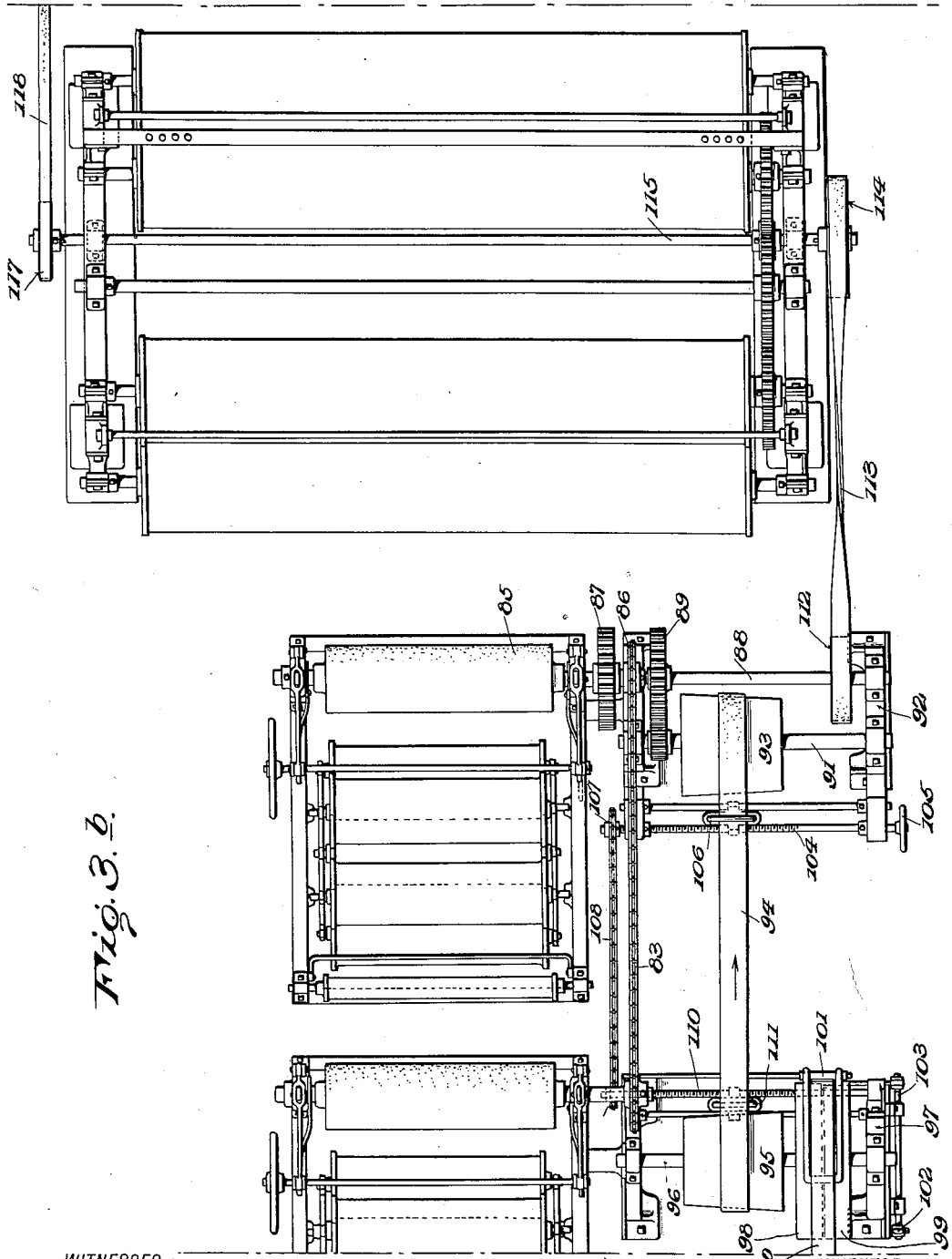

Patented July 8, 1924.

1,500,298

UNITED STATES PATENT OFFICE.

HAROLD MASON CHASE AND GEORGE WILMOT ROBERTSON, OF DANVILLE, VIRGINIA, ASSIGNORS TO RIVERSIDE AND DAN RIVER COTTON MILLS, INC., OF PITTSYLVANIA COUNTY, VIRGINIA, A CORPORATION OF VIRGINIA.

LONG-CHAIN-WARP-TREATING APPARATUS.

Application filed December 5, 1922. Serial No. 605,032.

*To all whom it may concern:*

Be it known that we, HAROLD MASON CHASE and GEORGE WILMOT ROBERTSON, citizens of the United States, and residents of Danville, in the county of Pittsylvania and State of Virginia, have invented certain new and useful Improvements in Long-Chain-Warp-Treating Apparatus, of which the following is a specification.

Our present invention relates generally to cotton warp treating apparatus and has to do in particular with the treatment of what are known as long chain warps up to the point of beaming where indigo or other dyes are employed requiring that the cotton be dyed in the warp.

It is commonly known that the preferred manner of handling warps is in rope form, what are known as long chain warps, and it is also commonly known that indigo and other dyes, which are more in the nature of pigments, require application to the warp before weaving.

In the usual treatment at the present time, long chain warps in what are known as "balls", are first boiled out, then dyed and then rewound on balls for transportation to another department where they are washed and then dried after which they are coiled loosely and transported to the beaming department where the threads or ends are separated into what is known as "sheet" form and subsequently "slashed" i. e., starched, again dried and finally wound in this form upon loom beams. In all known apparatus for the treatment of long chain warps the rewinding in balls after dyeing and transportation of said balls at least once before drying is an essential though costly operation, and in machines other than continuous dye machines this is done twice. Machines wherein the dye is maintained in approximately full strength by the intermittent or regular addition of dye stock are known as continuous dye machines as distinguished from those in which the warps gradually use up the dye in the first passage therethrough and are then reversed and passed through a second dye bath in order to render their color uniform throughout. While long chain warps have been dyed by various continuous machines they have invariably been delivered from such machines in a wet state, either wound upon balls or in boxes or cans, necessitating transportation, usually to a separate department, and passage through another run before reaching final finished and dried condition for beaming.

It is obvious that such methods might be much simplified by boiling-out, dyeing, washing and drying in a continuous manner so that at the end of a single run the long chain warps may be delivered ready for beaming without rerolling or winding and it is our primary object to accomplish this in a practical, efficient manner and to overcome the well-known difficulties among which are the expansion and contraction of the warps, and the likelihood of stretching to such an extent as to bring about too ready breakage of the threads or ends during and after their separation in the beaming operation.

To accomplish this we propose to divide the continuous machine into two ranges, in the first of which the warps are boiled-out and dyed and in the second of which they are washed and dried, in connection with certain regulating means whereby either range may be varied in speed of movement with respect to the other including a full stop.

Certain other objects enter into the invention moreover and one of these objects relates more especially to the dyeing of the ends and seeks to bring about even, uniform and thorough coloring with minimum dyestock and without waste.

These objects as well as the resulting advantages of our present invention will clearly appear in the course of the following description and by reference to the accompanying drawings, which form a part of this specification, and in which, Figure 1 is a diagram of the complete apparatus, Figure 2 is a side elevation showing the boiling-out and wash tanks, Figure 2ª is a continuation of Figure 2 showing the dye vats and a part of one of the wash tanks,

Figure 2^b is a continuation of Figure 2^a showing the remainder of the wash tank and the drier, Figure 2^c is a continuation of Figure 2^b showing the coiler, Figure 3 is a top plan view of the parts shown in Figure 2, Figure 3^a is a similar view of the parts shown in Figure 2^a, Figure 3^b is a similar view of the parts shown in Figure 2^b, Figure 3^c is a similar view of the parts shown in Figure 2^c, and Figure 4 is a cross section taken on line 4—4 of Figure 2.

Referring now to Figure 1 of the drawings it will be noted that the apparatus as a whole is arranged for a single continuous run of long chain warps 10 from balls, first through a boiling-out tank 11, and these balls may be positioned opposite the boiling-out tank by virtue of mounting the balls upon a truck 12 movable upon a track 13 whereby other ball carrying trucks may be easily shifted into place when a new set of warps are to be run. Upon emerging from the boiling-out tank, the warps pass into a second tank 14 which, if indigo dye is to be used, is a cold water tank as indigo is dyed cold. Next the warps pass into the dye vat 15 and subsequently after passage over the first oxidizing reels 16 are given a second immersion in the dye vat and then pass over the second oxidizing reels 17. From the reels 17, the warps pass over guide rollers 18 and around a vertically movable compensating roller 19, which is between the first and second ranges the former of which includes the tanks 11 and 14 and the dye vat 15.

In the second range, the warps pass from the compensator first into a wash tank 20 and then into a second wash tank 21 and then to the drier, taking a tortuous path downwardly through one vertical series 22 of drying cans and then upwardly through the other series 23 of drying cans. Finally the warps pass to the coiler 24 in a dry state and by this coiler they are loosely coiled upon a truck 25 movable on a track 26 so that when a run is finished the truck may be readily shifted from position to provide for the shifting of another truck into position for the next run.

By reference to Figures 2 and 3 it will be noted that from the balls 10^a on the truck 12, the several warps in rope form pass downwardly into the boiling-out tank 11 around a guide roller 27 at one end of the tank, and after circuitous passage around the internal rollers 28, finally passes upwardly out of the tank and between squeeze rolls 29, of which the upper roller is a pressure roller and the lower roller has a sprocket 31 driven by a chain 32. In this boiling-out tank all grease and other foreign matter is effectively removed and the surplus water removed from the warps by the squeeze rolls 29.

From the squeeze rolls 29 the warps pass downwardly into a wash tank 14 over a guide roller 33, and after circuitous passage around the internal rollers 34 of this tank, finally pass out between squeeze rolls 35 of which the lower roll has a sprocket 36 from which chain 32 extends, and is also provided with a gear 37 engaged by a gear 38, the latter mounted upon a countershaft 39. This countershaft has a gear 40 and a sprocket 41, the latter driving a chain 42, and the former engaging the gear 43 of a driven shaft 44. On this driven shaft are fast and loose pulleys 45 and 46, the entire mechanism adjacent to this driven shaft 44 being mounted in a frame 47 at one side of which a belt shifter 48 operates and is actuated by a hand lever 50 through connections 49 including an operating shaft and a connecting link. The belt shifter 48 controls the position of a belt 51, leading from a suitable source of power which may thus be shifted from one pulley to the other by manipulation of the belt shifting lever 50, and preferably this belt 51 extends from an overhead line shaft, not shown, from which it may be convenient to extend a second belt to the second range of the apparatus as hereinafter described.

By reference to Figures 2^a and 3^a in addition to Figures 2 and 3 it will be seen that the warps 10 pass downwardly into the dye vat 15 around a guide roller 52 and it is to be particularly seen from Figures 2^a and 3^a and also from Figure 1 that this dye vat has a single internal compartment provided with two sets 53 and 54 of internal warp guide rollers. As the rope warps pass downwardly into one end of the tank they proceed to the lower end of the set 53 of guide rollers and have a circuitous path around these rollers and upwardly through the dyestuff, the latter being in constant agitation and circulation by a series of agitators 55 in the form of paddles secured upon transverse shafts 56 whose opposite ends project beyond opposite sides of the vat. These shafts 56 have at one side of the vat sprockets 57 connected by sprocket chains 58 so that the several shafts 56 with their agitators 55 rotate in unison, the shaft 56 near the intake end of the vat having at its opposite end a sprocket 59 around which the lower end of a sprocket chain 60 extends.

After their circuitous travel around the guide rollers of the first set 53 of the dye vat, the rope or chain warps pass around a guide roller 61 and between squeeze rolls 62, of which the lowermost roll has a gear 63 engaging the gear 64 of a countershaft 65, this counter-shaft having a sprocket 66 around which the upper end of the agitator driving chain 60 extends, and is also provided with a sprocket 67 around which the before mentioned sprocket chain 42 extends. The shaft of the lower squeeze roll 62 also has a sprocket 68 from which a sprocket chain 69 leads. Upon their passage between the squeeze rolls 62 where the surplus dye liquid of the first dip is removed, the warps pass upwardly and for a considerable space around oxidizing reels 70 during which the dyestuff resulting from the first dip becomes oxidized so that the warps may again pass downwardly into the dye vat around a guide roller 71 to the lower portion of the second set 54 of internal guide rollers. The warps take a circuitous path upwardly around these guide rollers of the second set 54 and from the top of this set pass over a guide roller 72 and between squeeze rolls 73 of which the lower roll has a sprocket 74 driven by the sprocket chain 69 beforementioned. In this way the surplus dye liquid of the second dip is squeezed from the chain warps and these warps then pass upwardly for a considerable distance around oxidizing reels 75 and during such passage the dye accumulated during the second dip is oxidized and rendered insoluble.

This completes the first range of the apparatus and it is to be particularly noted that the several squeeze rolls 29, 35, 62 and 73 are all actuated through connections from the driven shaft 44 so that the movement throughout this range will be uniform and constant during operation except in so far as it may be desirable to have the rolls vary in surface speed to a slight extent by the use of rolls gradually increasing or decreasing in diameter throughout the range to compensate for the expansion or contraction of the warps. It is understood that such a variation will be a permanent matter calculated and allowed for at the time the machine is built so that successive increase in the diameters of the squeeze rolls in the direction of movement of the warps and to a very slight extent, will compensate for expansion of the warps and avoid any slack.

It is to be particularly noted in connection with the dye vat itself that we provide for two separate dips of the warps into the same dye chamber and the same dye liquid at all times in agitation and circulation through the use of the agitators 55, the warps passing between squeeze rolls and over oxidizing reels at the end of each dip so that by the intermittent or regular introduction of dye stock within the vat we insure uniform coloring of the warp without waste of dye stock and without the use of expensive apparatus which would necessarily be employed for maintaining separate dye vats in uniform condition with doubtful results.

From the second set of oxidizing reels 75, the warps pass over spaced guide rollers 76 and around a vertically shiftable compensating roller 77 below and between these guide rollers 76, on their way to the second range in which they first pass into the washing tank 20 over a guide roller 78. In this washing tank 20 the warps have a circuitous path around internal rollers 79 of the tank and, referring to Figures 2$^b$ and 3$^b$, from these internal rollers the warps pass out of the tank 20 between squeeze rolls 80 and from thence around a guide roller 81 and downwardly into the second washing tank 21. The lower squeeze roll 80 has a sprocket 82 driven by a sprocket chain 83.

Within the second washing tank 21 the warps have a circuitous path around internal rollers 84 and finally pass from these series of rollers 84 and upwardly out of the second washing tank between squeeze rolls 85 of which the lower roll has a sprocket 86 from which the before mentioned sprocket chain 83 extends for the driving of the squeeze rolls 80 of the first washing tank. The lower roll 85 also has a gear 87 which meshes with a small gear directly beneath the same and upon a countershaft 88 having a gear 89 thereon engaging the gear 90 of a driven shaft 91.

By referring particularly to Figure 3$^b$ it is to be plainly seen that the driven shaft 91 which with the countershaft 88 and the connections just described, is mounted in a frame 92, has thereon a cone pulley 93 engaging a belt 94 extending from a similar though oppositely tapering cone pulley 95 mounted upon a driven shaft 96 within a frame 97. This shaft 96 has fast and loose pulleys 98 and 99 to which a belt 100 extends, and this belt, seen partly in Figures 2$^b$ and 3$^b$ and partly in Figure 2$^a$ may extend from any suitable source of power as for instance the same overhead line shaft (not shown), from which the driving belt 51 of the first range of the apparatus extends.

Referring again to Figure 3$^b$ in particular, a belt shifter 101 is movable at one side of the frame 97 to shift the belt 100 from the pulley 98 to the pulley 99 and vice versa, under control of a belt shifting lever 102, through connections including a shaft and link 103 and it is thus to be seen that the two ranges of the apparatus may be independently started and stopped.

There is moreover mounted along each of the frames 92 and 97 a screw shaft, the screw shaft 104 along frame 92, having a hand wheel 105 and having an operative connection with a belt shifting member 106 positioned for engagement with the upper run of the cone pulley connecting belt 94. This screw shaft 104 has at its opposite end a sprocket 107 connected by an inclined sprocket chain 108 to the sprocket 109 at one end of the screw shaft 110 mounted along the frame 97, in a plane substantially below that of the screw shaft 104, and provided with operative connection with a belt shifting member 111 for engagement with the lower run of the belt 94 adjacent to the pulley 95.

Thus power for the operation of the second range of the apparatus, passing from driven shaft 96 to driven shaft 91 through belt 94, may be transmitted at a variety of speeds by virtue of the two cone pulleys 93 and 95 and the shifting connections adjacent to these pulleys for the belt 94, shifting of which may be accomplished from a single point, namely hand wheel 105 in view of the connection of the screw shafts 104 and 110. In this way the speed of movements of the chain warps through the second range of the apparatus may be readily controlled so that the compensating roller 77 will neither rise nor fall. Should this roller rise speed of movement of the second range may be quickly cut down while should the roller lower the speed of movement of the second range should be promptly increased and it is obvious either of these necessary regulations may be readily and quickly effected from a single point in our improved apparatus.

The countershaft 88 before described has a pulley 112 thereon connected by a twisted belt 113 with a pulley 114 mounted upon the centrally located driven shaft 115 of the drier and between the two vertical series of drying cans 22 and 23. This shaft 115 has bearings upon the lower transverse members 116 of the drier frame and it will be noted from Figure 3$^b$ that the pulley 114 is mounted upon one end of the shaft while upon the opposite end of the shaft a pulley 117 is mounted from which a belt 118 extends.

Shaft 115 also has a small gear 119 meshing with one of the intermediate cans of the series 22 downwardly around which in a circuitous path the warps first travel after delivery from the squeeze rolls 85 of the second washing tank 21 and their passage upwardly over guide roller 120 at one upper side of the drier. Upon the upper transverse member 121 of the drier frame, a gear 122 meshes with the gear of one of the upper drying cans of the series 22 and also with one of the upper drying cans of the series 23, upwardly through which latter series the chain warps pass from the lower end of the series 22, the warps finally passing from the upper end of the series 23 of drying cans and across the top of the series 22 of drying cans, to the coiler 24, which is more or less diagrammatically shown in Figures 2$^c$ and 3$^c$ and which may be of any suitable construction. At present we have shown the coiler as driven by the belt 118 beforementioned, and as comprising the required number of depending tubular warp guides 123, whose upper ends have swivelled supports through which the warps 10 individually pass, and whose lower ends are given circular movements so that the warps will be loosely and individually coiled as at 124 in Figure 2$^c$, it being understood that the warps are at this time dried and ready for transportation to the beaming room where the threads are detached and spread into sheet form for subsequent slashing, drying and winding upon loom beams.

By thus dividing the apparatus into two ranges capable of independent starting and stopping and one at least of which is provided with means for controlling and regulating its speed whereby to increase or decrease speed of movement with respect to the other range, we have solved the problem of a continuous apparatus for the treatment of long chain wraps, whereby cotton threads or ends may be handled as long chain warps which is much preferred to any other form, and may in a single run be boiled-out, dyed, oxidized, washed, dried and finally coiled for intermediate beaming at the end of such run. If the second range is slow, this will be indicated by lowering movement of the compensator which takes up the excess of warps and prevents slack. The operator then adjusts the speed of the second range by increasing the speed until the compensator is stationary. If the second range is running faster than the first range, the compensator will move upwardly in supplying the second range, and the operator then decreases the speed of the second range until the compensator is again stationary.

Furthermore by twice dipping the warps in the same dye vat we have not only accomplished the advantages hereinbefore set forth from a mechanical standpoint, but we have furthermore rendered this operation certainly uniform which is essential to the success of a continuous apparatus of this nature.

We claim:

1. In an apparatus for the treatment of long chain warps, boiling-out tanks, a dye vat, washing tanks and a drier arranged for a continuous run of long chain warps therethrough, and divided into two ranges having a compensating device therebetween and of which one range is provided with means to increase and decrease the speed of movement of warps therethrough, with respect to the other.

2. An apparatus for the treatment of long chain warps including warp boiling, dyeing, washing and drying devices arranged for the passage of long chain warps therethrough in a single run, said devices being divided into two ranges, one of which includes the washing and drying devices and is provided with speed regulating means operable to increase and decrease the speed of movement of the warps therethrough, with respect to the other range.

3. An apparatus for the treatment of long chain warps, including a series of devices successively through which long chain warps are guided in a single continuous run, means intermediate certain of said devices arranged to take up and let out warps on account of difference in the speed of movement of the warps upon opposite sides of such means, and means for adjusting the speed of movement of the warps at one side of said take up means with respect to the other side.

4. An apparatus for the treatment of long chain warps including warp boiling, dyeing, washing and drying devices arranged for the passage of long chain warps therethrough in a single run, said devices being divided into two ranges, one of which includes the washing and drying devices and is provided with speed regulating means operable to increase and decrease the speed of movement of the warps therethrough, with respect to the other range, and means to independently start and stop movement of the warps through said ranges.

HAROLD MASON CHASE.
GEORGE WILMOT ROBERTSON.